US00RE47064E

(19) United States
(12) Reissued Patent
Normand

(10) Patent Number: US RE47,064 E
(45) Date of Reissued Patent: Oct. 2, 2018

(54) TUBULAR PORTABLE FOOD STORAGE FOR TRANSPORTING PERISHABLE ITEMS

(71) Applicant: Marsha A. Normand, Beaumont, TX (US)

(72) Inventor: Marsha A. Normand, Beaumont, TX (US)

(21) Appl. No.: 15/442,256

(22) Filed: Feb. 24, 2017

Related U.S. Patent Documents

Reissue of:
(64) Patent No.: 8,985,330
Issued: Mar. 24, 2015
Appl. No.: 14/551,689
Filed: Nov. 24, 2014

U.S. Applications:
(62) Division of application No. 14/332,141, filed on Jul. 15, 2014, now Pat. No. 8,925,724.
(Continued)

(51) Int. Cl.
*A45C 11/20* (2006.01)
*B65D 77/04* (2006.01)
(Continued)

(52) U.S. Cl.
CPC ..... *A45C 11/20* (2013.01); *A45C 5/02* (2013.01); *A45C 5/08* (2013.01); *A45C 5/14* (2013.01); *A45C 5/146* (2013.01); *A45F 3/16* (2013.01); *A45F 3/46* (2013.01); *B65D 59/06* (2013.01); *B65D 81/38* (2013.01);
(Continued)

(58) Field of Classification Search
CPC ..... B65D 85/00; B65D 85/72; B65D 81/00; B65D 81/18; B65D 81/38; B65D 81/32; B65D 81/3205; B65D 81/3802; B65D 81/3806; B65D 81/3809; B65D 81/3837; B65D 81/3865; B65D 81/3876; F25D 3/08; A45F 3/46; A45F 3/16; A45F 3/18; A45F 3/02; A45F 3/08; A45F 3/06; A45F 2003/002; A45F 2003/205; A45F 2003/003; A45F 2003/006; A45C 5/02; A45C 5/08; A45C 11/20; A45C 2200/20
See application file for complete search history.

(56) References Cited

U.S. PATENT DOCUMENTS 2,738,893 A * 3/1956 Quinones, Jr. ..... A47J 47/18 114/352
2,833,436 A * 5/1958 Ruderian ..... A47J 41/02 206/217
(Continued)

FOREIGN PATENT DOCUMENTS

WO WO 2010/003257 A1 * 1/2010

*Primary Examiner* — Patricia L Engle
(74) *Attorney, Agent, or Firm* — Harrison Law Office, P.C.

(57) ABSTRACT

A portable container for transporting and storing a plurality of perishable items including food and beverage items, having a heat-resistant outer tubular member with double-layered insulation in an adjacent inner tubular member to accommodate a plurality of perishable items and to sustain the prescribed temperature of such food and beverage items and to promote longevity thereof. The portable container optionally includes a plurality of external compartments and has removable endcaps enclosing both ends thereof. Each endcap is conveniently removed from a tubular end and then used as a cup for drinking a plurality of beverage items or used as a dish for eating a plurality of food items.

4 Claims, 8 Drawing Sheets

Related U.S. Application Data

(60) Provisional application No. 61/886,055, filed on Oct. 2, 2013.

(51) Int. Cl.

| | |
|---|---|
| ***B65D 81/38*** | (2006.01) |
| ***B65D 83/00*** | (2006.01) |
| ***B65D 85/72*** | (2006.01) |
| ***B65D 59/06*** | (2006.01) |
| ***A45F 3/46*** | (2006.01) |
| ***A45C 5/02*** | (2006.01) |
| ***F25D 3/08*** | (2006.01) |
| ***A45C 5/14*** | (2006.01) |
| ***A45F 3/16*** | (2006.01) |
| ***A45C 5/08*** | (2006.01) |
| *A45F 3/20* | (2006.01) |

(52) U.S. Cl.
CPC ..... *B65D 81/3837* (2013.01); *B65D 81/3881* (2013.01); *B65D 85/72* (2013.01); *F25D 3/08* (2013.01); *A45C 2200/20* (2013.01); *A45F 2003/205* (2013.01)

(56) References Cited

U.S. PATENT DOCUMENTS 3,263,806 A * 8/1966 Ring ..... B65D 81/3834 206/139
4,351,165 A * 9/1982 Gottsegen ..... F25D 3/08 220/4.24
4,444,324 A * 4/1984 Grenell ..... B65D 25/04 206/545
4,516,409 A * 5/1985 Hobbs, Jr. ..... A45F 3/16 220/902
4,517,815 A * 5/1985 Basso ..... F25D 3/08 220/4.26
4,681,225 A * 7/1987 Schuster ..... 206/426
5,261,554 A * 11/1993 Forbes ..... A45C 11/20 220/592.16
5,272,890 A * 12/1993 Penxa ..... F25D 3/08 220/23.83
5,301,519 A * 4/1994 Howorka ..... A63B 55/00 220/739
5,417,327 A * 5/1995 Saumure ..... B65D 21/0228 206/427
5,535,889 A * 7/1996 Lin ..... A45C 11/20 206/546
5,653,124 A * 8/1997 Weber ..... A47G 19/2288 62/457.3
5,752,464 A * 5/1998 King ..... A01K 5/0114 119/51.5
5,803,259 A * 9/1998 Riedel ..... 206/455
5,823,136 A * 10/1998 Zarski ..... A01K 5/0114 119/51.5
5,884,580 A * 3/1999 Faircloth, Jr. ..... A01K 1/035 119/51.5
5,901,851 A * 5/1999 Charpentier ..... B65D 81/3205 206/581
6,186,352 B1 * 2/2001 Hwang ..... A45C 11/20 220/23.86
7,100,397 B1 * 9/2006 Gratteau ..... F25D 3/08 62/457.5
7,263,949 B1 * 9/2007 Seaford ..... A01K 5/0114 119/51.5
8,561,422 B2 * 10/2013 Jackman ..... 62/457.4
2008/0179270 A1 * 7/2008 Thibaut ..... B65D 1/04 215/6
2009/0188884 A1 * 7/2009 Nelson ..... A61J 9/008 215/6
2009/0223999 A1 * 9/2009 Hill ..... B65D 1/04 222/129
2013/0020342 A1 * 1/2013 Cardoso ..... B65D 81/3802 221/1
2013/0134161 A1 * 5/2013 Fogel ..... B65D 21/0209 220/23.83
2013/0327766 A1 * 12/2013 Skelton ..... A45C 11/20 220/23.89
2014/0144963 A1 * 5/2014 Moore ..... A45F 3/46 224/600
2015/0175320 A1 * 6/2015 Velmont ..... B65D 43/166 220/4.22
2015/0284138 A1 * 10/2015 Lane ..... B65D 21/0228 220/592.2
2017/0280700 A1 * 10/2017 Parker ..... A01K 97/06

* cited by examiner

IC
DF
350
360A
360B
315A
315B
320A
320B
325A
325B
355A
355B
370
375A
375B
380A
380B
315
320
325
355
360

TUBULAR PORTABLE FOOD STORAGE FOR TRANSPORTING PERISHABLE ITEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a divisional application of U.S. Non-Provisional application Ser. No. 14/332,141 filed Jul. 5, 2014, which claimed priority based upon U.S. Provisional Application Ser. No. 61/886,055 filed Oct. 2, 2013, both applications of which are incorporated by reference herein.

FIELD OF THE INVENTION

The present invention generally relates to portable containers for storing and transporting perishable items, and more particularly relates to cylindrical portable containers for storing and transporting perishable food and drink items such as sandwiches, fruits, soft drinks, bottled water, coffee. Embodiments relate to cylindrical portable containers that tend to promote longevity of perishable food and drink items for both human and pet consumption by inherently preserving food freshness and sustaining preferred beverage temperatures. Embodiments also relate to cylindrical portable containers adapted to enable safe and controlled transportation of medical supplies especially in the field and similar remote locations under exigent circumstances in which refrigeration is unavailable, and even to enable safe and controlled transportation of human organs for transplantation purposes in hospitals and other suitable medical facilities.

BACKGROUND OF THE INVENTION

There have been many varieties of portable lunch containers commonly known as "lunch boxes" which are generally configured to accommodate a lunch or other meal for children or adults. Of course, the term "box" originates from virtually all such portable lunch containers being configured as a square or rectangle. It will be appreciated that not only are such conventionally shaped and sized lunch boxes cumbersome and inconvenient, but also typically fail to sustain food freshness or prescribed preferred beverage temperature.

While there have been additions to this portable food container art in the form of soft, compact lunch sacks or the like, such newer containers still suffer from an inability to sustain acceptable food and beverage consumption conditions. Thus, based upon normal conditions for storing or emplacing conventional lunch boxes or lunch sacks, food freshness readily deteriorates and beverages tend to deviate from prescribed imbibing temperatures, wherein cold beverages become warm or hot beverages become tepid.

The prior art appears to be devoid of any convenient and sufficiently portable apparatus that reliably promotes freshness and implicated integrity of transported food and beverages. Thus, heretofore unknown in the prior art, embodiments of the present invention afford a conveniently configured cylindrical container adapted to both store and sustain freshness of various food items and beverage cans, and to be easily transported either via shoulder-strap or backpack, on a bicycle or motorcycle.

SUMMARY OF THE INVENTION

The present invention teaches tubular or cylindrical portable containers configured to accommodate a plurality of perishable items, including food and drink items, medical supplies, and the like under an enclosed and insulated contained environment that inherently tends to promote longevity and freshness while such perishable items are being stored therein or being transported from one location to another. As will be hereinafter described, embodiments of the present invention are configured for safely storing a variety of perishable items such as medications, medical supplies, sandwiches, potato chips, and individually-packaged servings of apple sauce, pudding, and like food accessories; and, similarly, for safely storing a plurality of various canned and bottled beverages such as plastic water bottles, aluminum soft drink and beer cans, and wine bottles.

Also contemplated hereunder are embodiments configured to accommodate a plurality of specialized remote medical and rescue applications such as military personnel transporting medical supplies in the field, hikers transporting prescription for personal health and over-the-counter medications for administering first-aid, construction workers working at construction sites, oil patch personnel engaged in exploration and fracturing operations at well sites, etc.—wherein preferred storage temperature and other characteristics may be rigorously controlled by isolating and insulating the diversity of rescue and medical supplies from adverse environmental and exigent circumstantial effects.

These and other objects and advantages of the present invention will become apparent from the following specification and accompanying drawings.

BRIEF DESCRIPTION OF THE DRAWINGS

FIG. 1A depicts a frontal perspective view of a food and drink embodiment of the present invention.

FIG. 1B-1 depicts an outer planar perspective view of an end cap of the embodiment depicted in FIG. 1A.

FIG. 1B-2 depicts an inner planar perspective view of the end cap depicted in FIG. 1B-1.

FIG. 1C-1 depicts an outer planar perspective view of the other end cap of the embodiment depicted in FIG. 1A, disposed at an opposite end of the end cap depicted in FIG. 1B-1.

FIG. 1C-2 depicts an inner planar perspective view of the end cap depicted in FIG. 1C-1.

FIG. 1D depicts a longitudinal cross-sectional view of the embodiment depicted in FIGS. 1A, 1B-1 and 1B-2, 1C-1 and 1C-2.

DETAILED DESCRIPTION

Figures 1, 1A, 1B, 1C, 1D, 2:
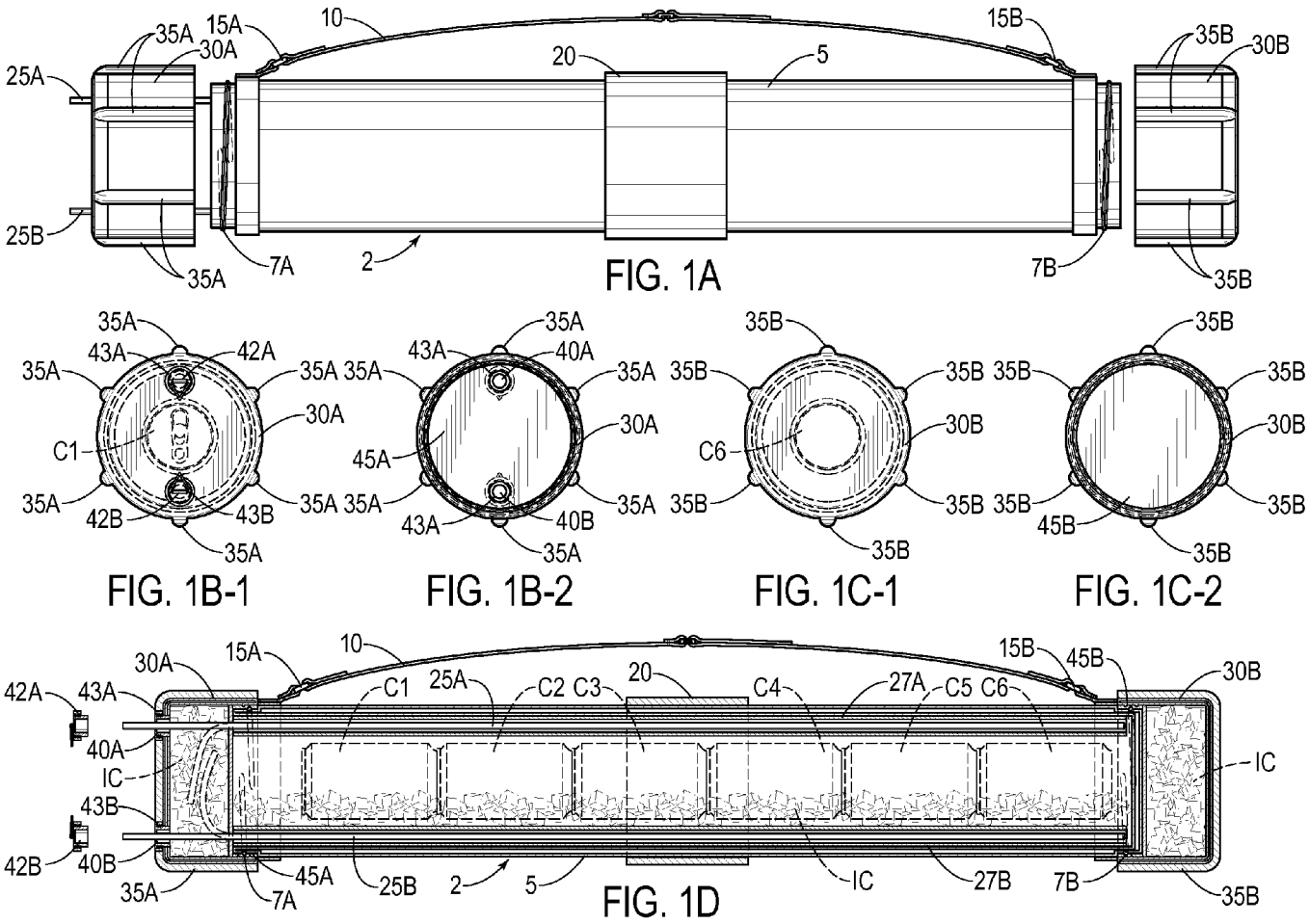

Reference is made herein to the figures in the accompanying drawings in which like numerals refer to like components. Referring collectively to FIGS. 1A-D, there are depicted various views of a typical food and drink embodiment of the present invention. More particularly, FIG. 1A depicts a frontal perspective view of a food and drink embodiment of the present invention 2 comprising tubular food and beverage container 5 having respective pair of opposite endcaps 30A-B and strap 10. FIG. 1B-1 depicts an outer planar perspective view of endcap 30A thereof and FIG. 1B-2 depicts an inner perspective view of the other opposite end 30B thereof. Similarly, FIG. 1C-1 depicts an outer planar perspective view of the other endcap 30B thereof, disposed at the opposite end of endcap 30A depicted in FIG. 1B-1. FIG. 1C-2 depicts an inner perspective view of the other opposite end 30B thereof. FIG. 1D depicts a cross-sectional view of the frontal perspective view depicted in FIG. 1A, illustrating plurality of beverage cans C1, C2, C3, C4, C5 and C6 disposed adjacent each other stacked in an end-to-end relationship from endcap 30A to opposite endcap 30B.

Food and drink embodiment 2 comprises rigid, preferably Stainless Steel, insulated hollow cylindrical tube 5 with strap 10 fixedly attached thereto, engaged through pair of retaining rings 15A-B disposed at each opposite end thereof, proximal to each respective endcap 30A-B. End cap pair 30A-B is preferably screwably affixed to each respective end of insulated hollow tube 5 via external thread pair 7A-B, respectively. Endcap gasket pair 45A-B assure an air-tight, leak-proof seal at each end of cylindrical container 5. Rubberized grip 20 is circumferentially disposed about the middle portion of cylindrical container 2, with each of endcap 30A and endcap 30B disposed symmetrically relative thereto. As will be elucidated hereinafter, endcaps 30A-B are preferably configured to enable use as drinking cups, food dishes, soup bowls, or like food or drink container.

It will be understood by those skilled in the art that each endcap of endcap pair 30A-B should preferably include plurality of rubberized grip strips 35A-B, respectively, to facilitate removal of the endcaps from cylindrical container 5. Still focusing upon the endcaps shown in FIGS. 2B-1 and 2B-2, each port of port pair 40A-B is configured with a port plug of port plug pair 42A-B which would be removed therefrom to insertably receive preferably a heavy-duty straw of heavy-duty straw pair 25A-B. Straw pair 25A-B is sealed within corresponding pair of longitudinal channels 27A-B, respectively, by port gasket pair 43A-B.

Thus, pair of preferably heavy-duty straws 25A-B may optionally be inserted into corresponding pair of longitudinal channels 27A-B, respectively. More particularly, straw pair 25A-B would be inserted into pair of ports 42A-B which constitutes entry points into corresponding pair of longitudinal straw-enclosing channels 27A-B. When not being invoked, it will be understood that each plug of plug pair 42A-B would be frictionally and screwably inserted into pair of ports 40A-B, respectively, thereby sealing channel pair 27A-B. As illustrated in FIG. 1D, it is a feature and advantage of the present invention that, when heavy-duty, flexible straw pair 25A-B is not being used, the exposed end thereof proximal to straw port pair 40A-B may be folded to fit within endcap 30A while the straw pair is still inserted into corresponding channel pair 27A-B. This protocol affords the convenience of having the straws instantaneously and conveniently available is a need therefor should suddenly arise. A user would simply unscrew the appropriate straw plug of plug pair 42A-B and guide the corresponding straw's free end into the corresponding straw port of straw port pair 40A-B.

Those skilled in the art will appreciate that, as illustrated in the arrangement depicted in FIG. 1D, each beverage can C1, C2, . . . of this plurality of beverage cans is positioned with its snap-top end facing endcap 30A of food and beverage embodiment 2, with this plurality of beverage cans preferably thoroughly immersed in plurality of ice cubes IC or like coolant. Besides surrounding these beverage cans to achieve preferred chilled drinking temperature of the contained beverages, plurality of ice cubes IC should be adiabatically enclosed in container 5 secured at each end thereof by endcap pair 30A-B. It should be understood that the term "ice cubes" as contemplated herein is not limited to full-sized ice cubes, but encompasses every variation of pieces or portions of solid-formed ice including full cubes or half cubes of various sizes, cubelets, nuggets, and even gourmet cubes. It will be self-evident to those skilled in the art that the preferred size of ice incorporated into the embodiments disclosed hereunder would be to fill virtually every available space therewith to achieve the intended cooling environment to sustain prescribed temperatures of implicated beverages and food items and concomitant accessories therefor. Accordingly, focusing on FIG. 1B-1, there is seen a conventional snap-top disposed atop beverage can C1 in conjunction with plurality of grip strips 35A preferably disposed uniformly about circumference of cylindrical container 5. Thus, in the configuration illustrated in FIGS. 1B-1 and 1B-2, six grip strips 35A are disposed longitudinally on the circumference of endcap 30A at 60°, 120°, 180°, 240°, 300°, and 360°. Similarly, in the configuration illustrated in FIGS. 1C-1 and 1C-2, six grip strips 35B are disposed longitudinally on the circumference of endcap 30B at 60°, 120°, 180°, 240°, 300°, and 360°.

It will become evident to those skilled in the art that a plurality of food and drink items may be inserted into an embodiment of the present invention as will be hereinafter described. Referring collectively to FIGS. 1A-D and FIGS. 2A-D, after such food and drink items have been emplaced therewithin or while being emplaced, such embodiment would be appropriately sealed at each end thereof with endcap pair 30A and 30B, respectively. Thus, endcap 30A is screwably attached to threaded end 7A and endcap 30B is screwably attached to threaded end 7B of container 5. Endcaps 30A-B are preferably configured with plurality of rubberized grip strips 35A-B and gaskets 45A-B to assure that each container-end is securely sealed to promote the integrity and longevity of the perishable food and drink stored therewithin. It should be appreciated that these rubberized grip strips 35A-B facilitate not only conveniently, but also thoroughly securing and releasing endcap pair 30A-B.

The present invention contemplates that, once the endcaps have been properly affixed to corresponding threaded ends of container embodiments hereof, the longevity of food and drink items stored therein has been effectively assured because an airtight and leakproof seal has been established.

It has been found that material of construction of cylindrical internal wall affixed adjacent outer preferably stainless steel outer wall of food and drink containers taught herein should preferably be selected on the basis of inherently tending to sustain either the relatively warm or relatively cool temperature of the plurality of perishable edible and drinkable items stored therein, thereby promoting the contemplated protracted longevity and palatability thereof. For instance, it has been found that particularly effective material is Bodum heat-resistant, insulated double-layered glass having trade name "Tresso' thermo glass" which is manufactured by Bodum USA, Inc. Such Bodum double-layered glass comprises borosilicate glass, silicone coating, and plastics selected from styrene-acylnitrile-copolymeride plastic, polypropylene plastic, and polyoxymethylene plastic. Bodum's underlying technology is more particularly disclosed in Patent Application Publication No. WO2010/003257 dated Jan. 14, 2010. As represented by the Bodum manufacturer and substantiated by testing embodiments hereof, temperatures of food and drink items stored therein tend to be sustained for as long as about 24 hours. It will be understood that an alternative material of construction, commensurate with the unique permanently sealed double-walled tubular container characteristics contemplated hereunder, is polycarbonate containers manufactured by the Tervis Tumbler Company headquartered in North Venice, Fla.

Figure 2D:
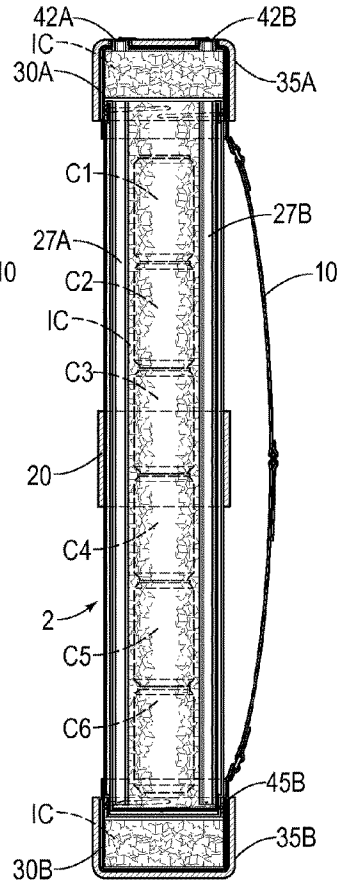
FIG. 2D depicts a frontal cross-sectional view of a food and drink embodiment of the present invention, storing a plurality of cans of cold beverages.
Figure 2C:
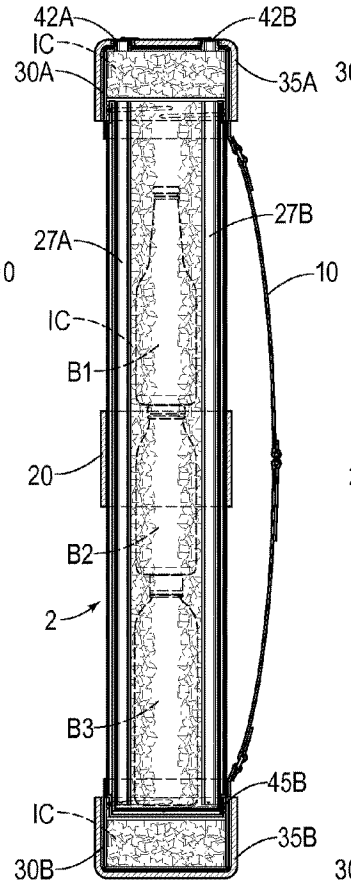
FIG. 2C depicts a frontal cross-sectional view of a food and drink embodiment of the present invention, storing a plurality of cold long-neck beer bottles.
Figure 2B:
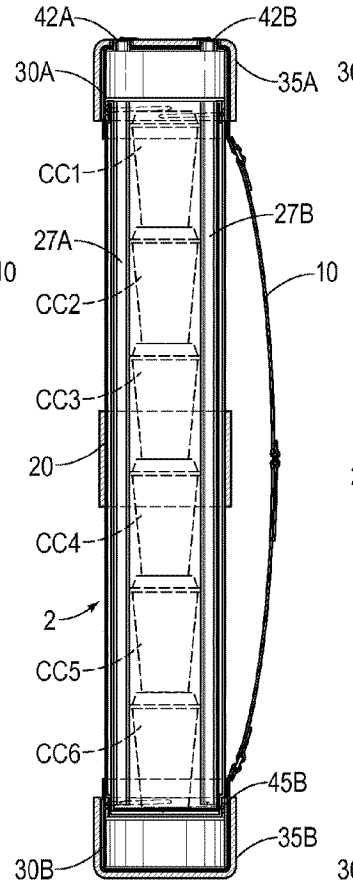
FIG. 2B depicts a frontal cross-sectional view of a food and drink embodiment of the present invention, storing a plurality of hot coffee beverages.
Figure 2A:
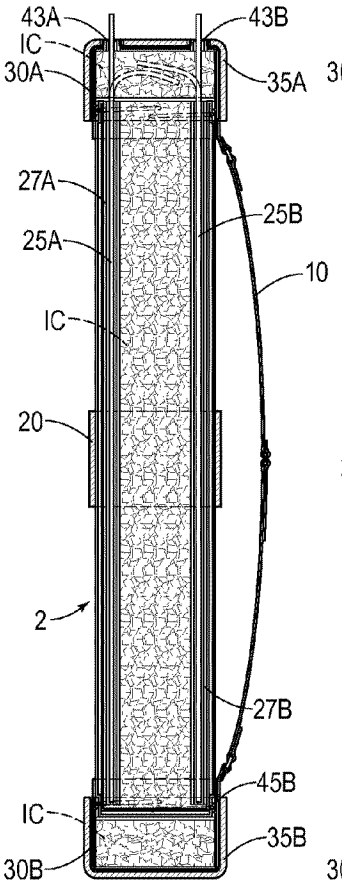
FIG. 2A depicts a frontal cross-sectional view of a food and drink embodiment of the present invention, storing a plethora of ice cubes.

Accordingly, as shown in the simplified schematic drawings depicted in FIGS. 2A-D, a plurality of identical beverage cans or beverage bottles or individual-portion food containers may be stacked—with the contents' preferable storage-temperature being sustained for approximately 24 hours and perhaps even longer. Thus, in each of FIGS. 2A, 2C and 2D an appropriate plethora of ice cubes IC would be loaded into the respective embodiment shown—with the integrity of ice cubes IC being sustained nominally for up to 24 hours. Also depicted for illustrative purposes in FIG. 1D and FIG. 2A is straw pair 25A-B which would be inserted through straw port pair 40A-B and into straw longitudinal channel pair 27A-B, respectively. Also depicted is port plug pair 42A-B which preferably screwably seals corresponding port pair 40A-B with the aid of port gasket pair 43A-B, thereby sealably capping straw longitudinal channel pair 27A-B when either or both implicated straws is or are not being invoked. It should be apparent to those conversant in the art that this two-straw parallel configuration enables two people simultaneously or sequentially or intermittently to drink the enclosed beverages including cold ice water. It will be readily appreciated that FIG. 2A depicts the instant container 5 being exclusively filled with ice IC whereupon the implicated beverage would be cold water preferably imbibed through a straw of straw pair 25A-B, albeit the enclosed ice melting at a slow rate as herein described.

Ergo, under exigent circumstances in the field or otherwise in remote locations and/or extreme weather conditions, up to two people may simultaneously sip cold water through a straw from a single container 5, notwithstanding being encumbered with hygienic disadvantages. Indeed, embodiments of the present invention may even be shared sequentially or intermittently among several people if circumstances merit survival or the like extenuating circumstances. On the other hand, FIG. 2C depicts the instant container 5 storing plurality of long-neck bottles B1, B2, B3 enclosed within plurality of ice cubes IC. Similarly, FIG. 2D depicts the instant container 5 storing plurality of beverage cans C1, C2, C3, C4, C5, C6 enclosed within plurality of ice cubes IC. As an example of application hereof to hot beverages rather than cold beverages, FIG. 2B depicts instant container 5 storing plurality of securely covered coffee cups CC1, CC2, CC3, CC4, CC5, CC6. As herein described, judicious selection of the material of construction of preferably dual-walled, well-insulated container 5 assures that, attributable to its adiabatic properties, the relatively hot temperature of the coffee or other beverage such as hot tea or hot chocolate be sustained during protracted time periods of up to 24 hours.

In its simplest form, container embodiments of the present invention may be configured without compartments or partitions. It is well known in the art that many food items are widely available in portable packs that are suitable for being emplaced into coolers and the like notwithstanding being adjacent other food and drink packs or other portable individual-servings containers. Nevertheless, to organize and effectively separate different types of food and beverage items, it has been found to be advantageous to accommodate such anticipated plurality of perishable items into suitably sized and shaped compartments or partitions. Embodiments hereof not only contemplate internal compartments for accommodating sandwiches, fruit packs, and the like, but also external compartments that may be easily and conveniently attached to appropriately sized and configured food and drink containers such as taught hereunder. It will also become evident that appropriately configured embodiments of the present invention may be invoked to accommodate specialized remote applications such as transporting medical supplies in the field by military personnel; transporting over-the-counter medications to administer first-aid by hikers, mountain climbers, bicyclists, construction workers working at construction sites, oil patch personnel engaged in exploration and fracturing operations at well sites, etc.—wherein the preferred storage temperature and other characteristics of medical supplies for rendering first aid should preferably be rigorously controlled by being isolated and insulated from adverse environmental effects. Of course, having such assortment of suitably sized compartments and the like will assure that individually stored perishable items are properly isolated from each other, thereby assuring the items' integrity and promoting longevity thereof.

Figures 4A, 4B, 5A, 5B:
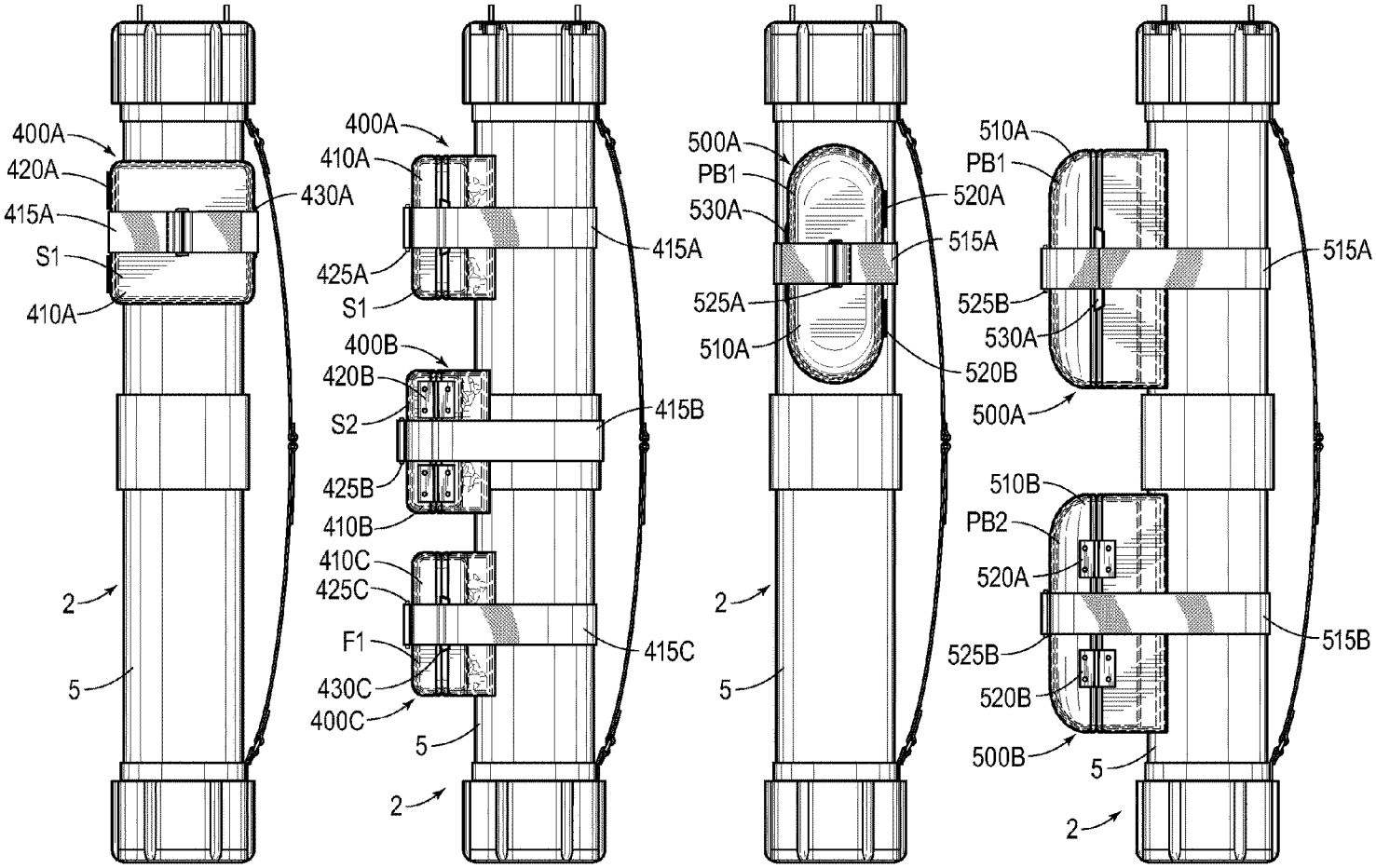
FIG. 4A depicts a simplified frontal view of a food and drink embodiment depicted in FIG. 1A, having an external compartment affixed to the circumference thereof.
FIG. 4B depicts a simplified frontal view of a food and drink embodiment depicted in FIG. 1A, having a plurality of external compartments affixed to the circumference thereof.
FIG. 5A depicts a simplified frontal view of a food and drink embodiment depicted in FIG. 4A, but having an elongated external compartment affixed to the circumference thereof.
FIG. 5B depicts a simplified frontal view of a food and drink embodiment depicted in FIG. 4B, but having a plurality of elongated external compartments affixed to the circumference thereof.

Referring now to FIGS. 4A and 4B, there are depicted similar embodiments of the present invention 2 also configured in an elongated disposition for internally storing a plurality of beverages, sandwiches, and food accessories and the like—in conjunction with optionally affixing external compartments to the circumferential surface of cylindrical container 5 as will be hereinafter described. Thus, these two figures depict embodiments thereof having, besides the hereinbefore described internal end-to-end storage capability for accommodating various food and drink items, an external capability for externally affixing a plurality of successive preferably substantially rectangular auxiliary compartments or partitions in a circumferential relationship with external surface of elongated container 5. It will be understood that one lateral side of such auxiliary compartments or partitions may optionally be configured with sufficient concavity to frictionally fit or pair with the underlying cylindrical container surface.

Focusing on FIG. 4A, there is depicted compartment or partition 400A configured for preferably including basket 410A for enclosing an individual, adequately wrapped or otherwise packaged sandwich S1. It should be understood that basket 410A could also store a plurality of related food accessories, such as an individual container of apple sauce, cole slaw, fruit cup, or pudding, or an individually wrapped apple or other comparable fruit or vegetable, or like food accessory. Compartment 400A is shown securably but releasably affixed to the circumference of container 5 with an elastic band 415A stretched thereabout to secure the top and bottom portion thereof. This externally-attached compartment is also depicted with optional hinge 420A and with optional latch 430A, oppositely disposed relative to each other. While it will be appreciated that hinge 420A and latch 430A enable compartment 400A to be readily open and closed with minimal effort, and afford a heightened level of security to the closure of compartment 400A, it is nevertheless anticipated that properly sized elastic band 415A will provide adequate closure thereof.

Now focusing on FIG. 4B, there are depicted three successive external compartments or partitions 400A, B and C each configured for preferably enclosing a basket 410A, B and C, respectively, for encasing an individual adequately wrapped or otherwise packaged sandwich or related food accessory. Each of compartments 400A-C are shown secured via corresponding plurality of Velcro rings 425A-C. Thus, more particularly, external compartment 400A is depicted enclosing basket or the like 410A which, in turn, encases individual sandwich S1 or perhaps a portion thereof. Similarly, external compartment 400B is depicted enclosing basket or the like 410B which, in turn, encases individual sandwich S2 or perhaps a portion thereof. External compartment 400C is depicted enclosing basket or the like 410C which, in turn, encases individual fruit pack F1 and is secured by latch 430C. Plurality of external compartments 400A-C should preferably be releasably secured to circumference of cylindrical container 5 via corresponding plurality of elastic bands 415A-C, respectively, stretched thereabout to secure the top and bottom portion thereof.

It should be appreciated by those skilled in the art that the sandwich baskets and the like contemplated hereunder would preferably be constructed from a Bodum or material having comparable properties to assure the integrity and longevity of the securely encased sandwich. It will also be appreciated that the elastic bands contemplated hereunder should preferably be constructed from high-grade Spandex or like material to afford sufficient elasticity but while also securely sustaining such sandwich or food item enclosure. Those skilled in the art will also comprehend that plurality of external compartments 400A, B and C, while depicted in FIG. 4B as being congruent to each other, may vary in size and shape to accommodate the food accessory or the like that will be contained therein. It should be evident to those skilled in the art that embodiments of the present invention may also be invoked in the diversity of applications contemplated hereunder in the absence of baskets 410A-C. Of course, the preferred course of action is for a sandwich or any food item to be adequately wrapped or otherwise enclosed with disposable wrapping or the like, to assure its being consumed as contemplated notwithstanding being stored over a protracted time period and/or being transported over rough terrain or to remote locations perhaps even under adverse or exigent environmental conditions.

FIGS. 5A and 5B depicts other embodiments of the present invention having a plurality of external partitions configured for accommodating a popular elongated sandwich alternatively referred to as a "Po-boy" or "Poorboy" or "Sub" or "Hoagie." Referring to FIG. 5B, partitions 500A and 500B are externally affixed to circumference of cylindrical container 5 of food and beverage container embodiment 2 via elastic bands 515A-B. Enclosed within partitions 500A-B preferably are corresponding food baskets 510A-B, respectively, which, in turn, encase Po-boy sandwiches PB1 and PB2, respectively. In view of the relatively elongated configuration of Po-boy baskets 510A-B, the top and bottom portions of partitions 500A and 500B should preferably be pivotally interconnected either with a suitable hinge or latch arrangement. Hence, for exemplary purposes only, top and bottom portions of partition 500A are shown secured via latch 530A, while top and bottom portions of partition 500B are shown alternatively secured via hinge pair 520A and 520B. As hereinbefore described, Velcro ring 525B is provided to enable adjustment of elastic bands 515A-B assure secure attachment of plurality of implicated external partitions to the circumference of the cylindrical container embodiments taught hereunder.

Figures 3A, 3B, 3C, 3D, 3E, 3F, 3G, 3H, 3I:
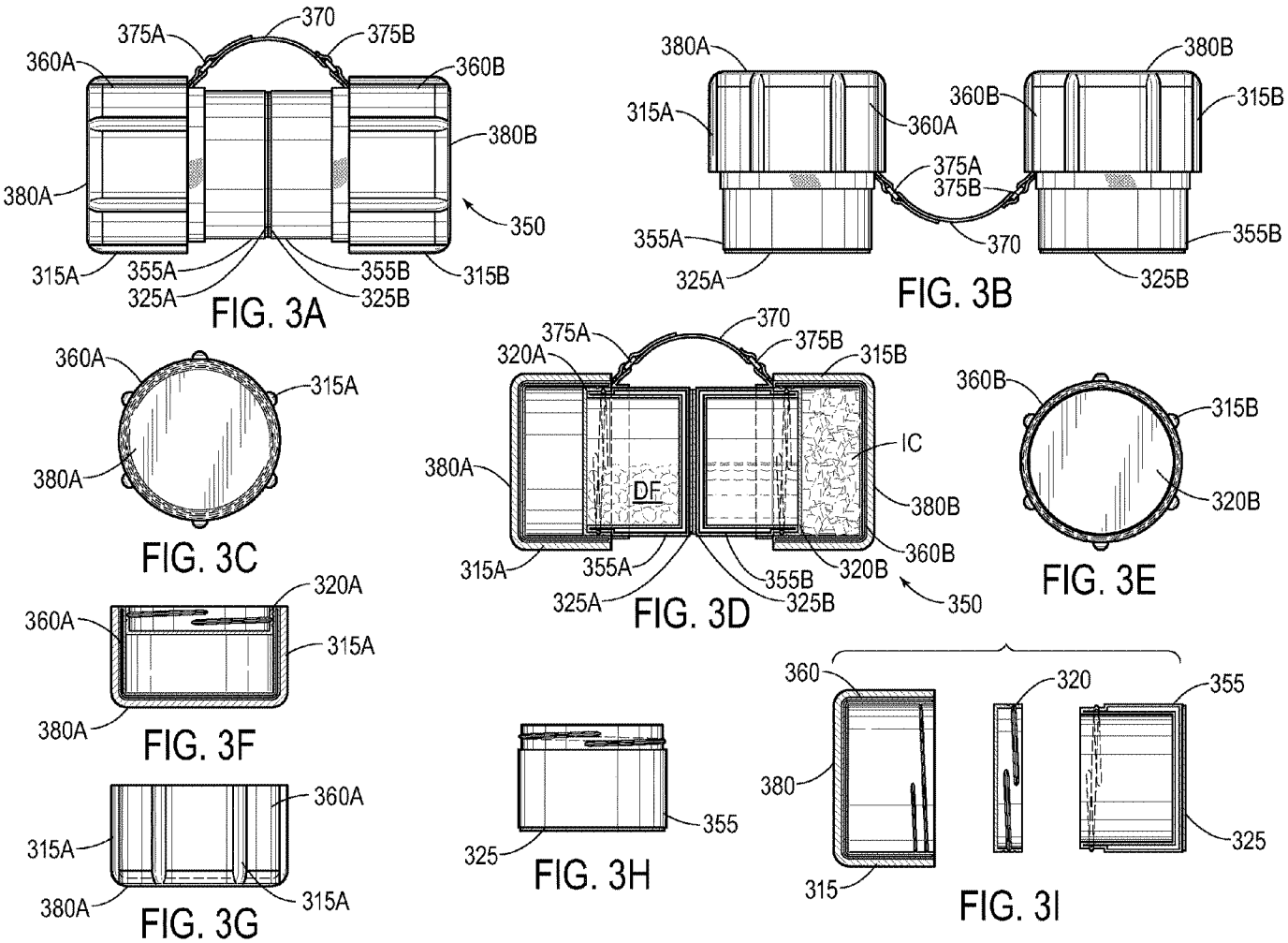
FIG. 3A depicts a simplified frontal view of a dog food and drink embodiment of the present invention, comprising two conjoined congruent partitions.
FIG. 3B depicts a simplified perspective frontal view of the dog food and drink embodiment depicted in FIG. 3A, with the two congruent partitions separated from each other.
FIG. 3C depicts a right side, outer view of the left endcap portion of the dog food and drink embodiment depicted in FIG. 3A.
FIG. 3D depicts a cross-sectional cut-away frontal view of the dog food and drink embodiment depicted in FIG. 3A.
FIG. 3E depicts a right bottom view of the right endcap portion of the dog food and drink embodiment depicted in FIG. 3B.
FIG. 3F depicts a cross-sectional cut-away frontal view of the endcap depicted in FIG. 3D.
FIG. 3G depicts a side view of the endcap depicted in FIG. 3F.
FIG. 3H depicts an isolated frontal view of the embodiment depicted in FIG. 3D
FIG. 3I depicts an exploded frontal view of the embodiment depicted in FIG. 3D.

FIGS. 3A-H depict another embodiment contemplated hereunder comprising two congruent partitions preferably magnetically urged together at mutual proximal ends thereof. The embodiment depicted therein illustrate the several features and advantages of such a magnetic embodiment 350 wherein respective proximal ends 355A and 355B are magnetically attracted together while in close proximity of each other, thereby, in turn, urging respective partitions 360A and 360B to be conjoined. As depicted in FIGS. 3G-3H, gasket pair 320A-B is preferably screwably attached to outer exposed ends 355A-B of magnetic bases 325A-B, respectively, to achieve the airtight and leakproof connection contemplated hereunder. Also shown in FIGS. 3A-B and 3C is strap 370 which is connected at each end thereof to each of respective D-ring or like member 375A-B for releasably attaching strap 370 to corresponding partitions 355A-B, respectively.

Although it should be evident that embodiment 350 may be used in diverse applications and for humans and pets, FIGS. 3A-H depict an embodiment adapted for accommodating the food and drink needs of a pet, namely, a dog. Focusing now on FIGS. 3A-B, it is seen that each partition 355A-B is inherently configured with a dish or bowl member preferably having a rubberized bottom or like non-slip or abrasive member 380A-B, respectively, to avoid inadvertent movement or sliding while dog food or water is being consumed therefrom by a dog. Strap 370 may remain attached to partitions 355A-B during use for stability or other purposes, or may be removed if deemed to be advantageous. As hereinbefore described, embodiments of the present invention are constructed with air-tight and water-tight endcaps or endportions to prevent contamination and leakage, and to promote the longevity of the food and drink contents stored therein. For the instant pet embodiment, such partitions 360A-B with corresponding magnetic base 380A-B become the bowl or dish or cup member. As suggestions by the illustrated embodiments depicted-in FIGS. 3A-G, dog embodiments should preferably be sized to accommodate particular dog attributes. Thus, dog food dish or bowl partitions should preferably be sized with a nominal height of about 3 inches and with a diameter varying from about 6 to 9 inches depending upon whether the dog is considered to be small or large. The pair of magnetic bottoms 380A-B, as hereinbefore described, assures that each partition 360A-B remains affixed to the other while in close proximity thereto. FIG. 3D shows plurality of ice cubes IC imparting sustained cool temperatures within food and drink container embodiment 350, thereby sustaining the preferred palatable temperature for consumption of dog food DF stored therein. It will be appreciated that each partition 360A-B when situated in a connected disposition, but which may be readily removed therefrom when each such partition is used separately to afford drink or food to the dog. As shown, strap 230 may be secured at the hinge transverse end to enable this sandwich embodiment to be conveniently transported by engaging the strap over the shoulder for ease of carrying—as is a prevalent feature and advantage of embodiments hereof. Strap 230 may be releasably attached at each respective proximal end 205A-B of first and second partitions 210A and 210B, respectively, constituting the instant partition pair of dog food embodiment 200.

It will also be appreciated by those conversant in the art that another embodiment of the present invention could be configured to accommodate a portable container for use by new mothers. Compartments and like partitions would be emplaced therein to properly position a plurality of baby bottles and to slidably receive baby formula and other baby-specific perishable items such as baby food jars and medications. It should be evident that such an embodiment would enable a mother or other adult to safely store such plurality of bottles at prescribed temperature—relatively cold or relatively warm. If necessary for a newborn or recently born baby, another embodiment of the present invention could be invoked to sustain relatively warm or perhaps tepid temperature of a prescribed formula or the like. Thus, it should be clearly understood that there are a plethora of embodiments having suitably configured compartments or partitions for accommodating a diversity of applications heretofore not possible in the art.

Figure 6A:
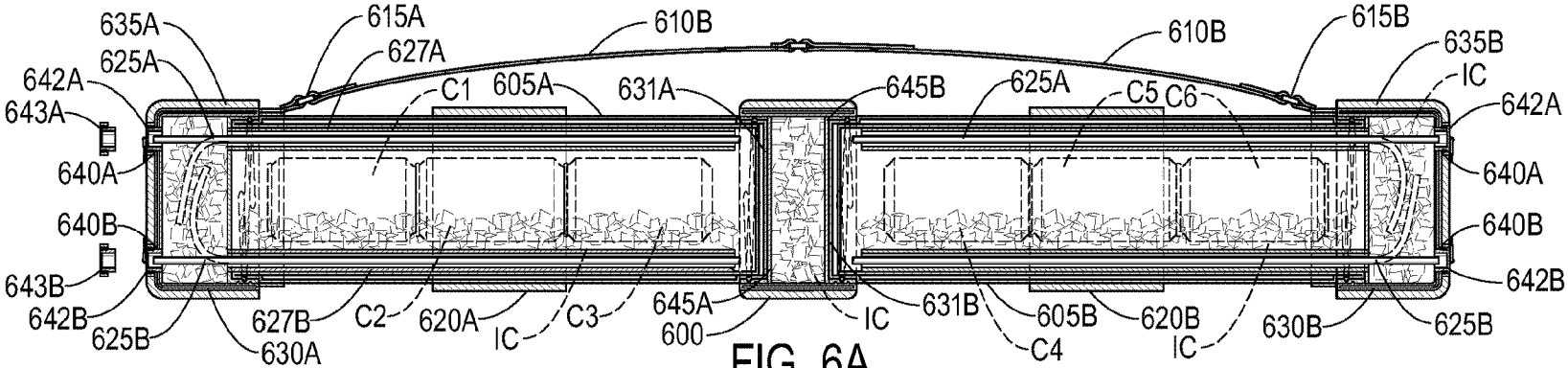
FIG. 6A depicts a simplified frontal view of two conjoined congruent food and drink embodiments depicted in FIG. 1D.
Figure 6B:
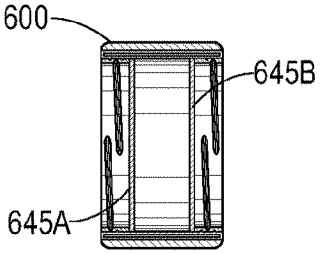
FIG. 6B depicts an isolated schematic frontal view of the joinder of the embodiments depicted in FIG. 6A.

Now referring to the embodiment of the present invention depicted in FIGS. 6A and 6B, there is depicted two conjoined portable cylindrical food and beverage storage containers as depicted in FIG. 1D and hereinbefore described. More particularly, portable storage container 605A is conjoined with like portable storage container 605B via coupler 600 configured with pair of cap gasket pair 645A-B to assure that this joinder is both air-tight and leak-proof. It will be understood that an end of each cylindrical container 605A-B would be securely conjoined with coupler 600, which is fraught with ice cubes IC, in like manner that the cylindrical embodiments taught hereunder are conjoined with corresponding endcap thereof. Food and beverage container 605A is filled with plurality of beverage cans C1, C2, C3 arranged in a consistent top end-to-bottom end disposition. Similarly, food and beverage container 605B is filled with plurality of beverage cans C4, C5, C6 arranged in a consistent top end-to-bottom end disposition. It will be seen that straps 610A-B for each cylindrical container 605A-B may also be conjoined via corresponding strap retaining ring pair 615A-B.

Yet another application of suitably configured embodiments hereof would be a portable cylindrical container as hereinbefore described, but one which typically wouldn't be carried to remote locations and the like, but which could be rolled on a set of wheels to prescribed locations. For instance, the food and beverage embodiment depicted in FIGS. 7A-7I would be particularly useful for transporting a plurality of food and beverage items for social engagements and even to sports events and outdoor cultural activities and the like, provided, of course, that the implicated terrain were conducive to rolling such an embodiment on relatively firm ground and like conditions.

Figures 7A, 7B, 7C:
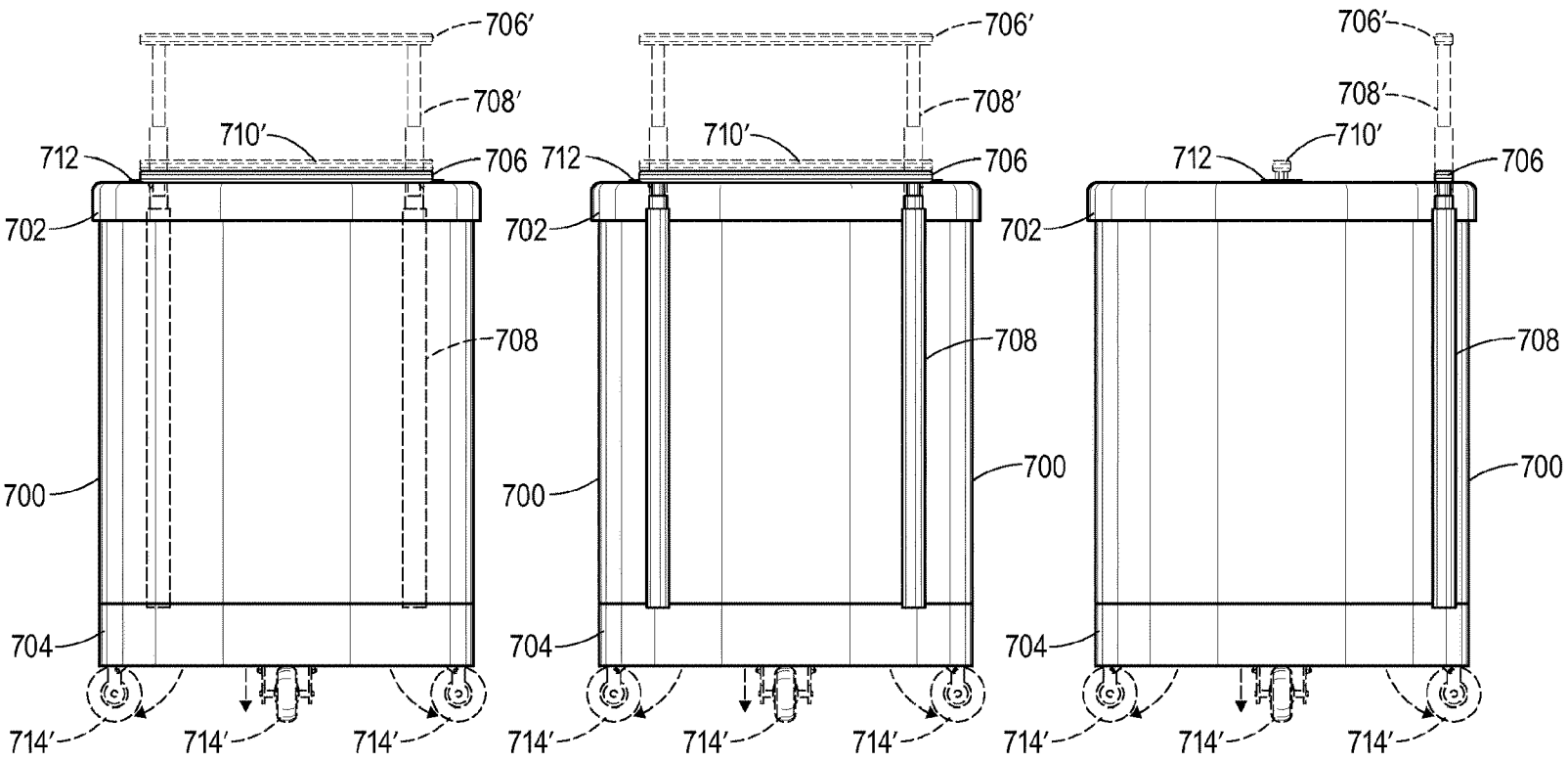
FIG. 7A depicts a simplified frontal view of a food and drink rolling cooler embodiment of the present invention.
FIG. 7B depicts a rear view of the embodiment depicted in FIG. 7A.
FIG. 7C depicts a side view of the embodiment depicted in FIGS. 7A-B.

Thus, depicted therein is rolling cylindrical container 700 comprising preferable double-walls within a stainless steel cylinder as hereinbefore described, and having cooler lid 702 and attached lid handle 710 configured to be received within handle trough or recess 712 when not disposed in an extended position. Also shown are plurality of wheel wells 704 for accommodating corresponding plurality of retractable wheels 714. It will be understood that this plurality of retractable wheels 714 are identified with numeral 714' when depicted with dotted lines indicative of being disposed in an inactive, retracted position. On the contrary, when these wheels are pivoted into an active roller-ready position, the exposed wheels are identified with numeral 714. As shown therein is a structure including telescoping handle 708 for conveniently transporting the instant rolling food and beverage container embodiment 700. It should be understood that this container handle is identified as 708' when disposed in a retracted, non-telescoped position. Similarly, cooler handle hand-grip 706 is identified as 706' when disposed in a retracted, non-telescoped position. Thus retracted telescoping container handle 708 is depicted in FIGS. 7A-7C with dotted lines representing its corresponding extended position including hand-grip 706' disposed thereatop. Of course, this plurality of wheels should be retracted when the instant cooler embodiment is not purposefully being moved so that it's position may be stabilized and the integrity of its perishable contents may be undisturbed, thereby avoiding damage thereto.

It should also be appreciated that pivoting plurality of retracted wheels 714' into a corresponding active, roller-ready disposition (714) may be activated by virtually any of several methods well known in the prior art. As an example, but not intended to limit the scope hereof, plurality of retracted wheels 714' may be activated simultaneously with container telescoping movement handle 708' being telescoped into an extended position (708) disposed above container lid 702. As shown in FIGS. 7A-D, container movement handle 708 comprises a substantially horizontal transversal member supported by a substantially perpendicular pair of vertical retractable supports at each end thereof with a rubberized handle grip disposed upon each handle support. It will be appreciated that this transversal member should preferably be sized intermediate between the diameter of instant cooler embodiment 700 and concentric smaller diameter lid 702

Figure 7F:
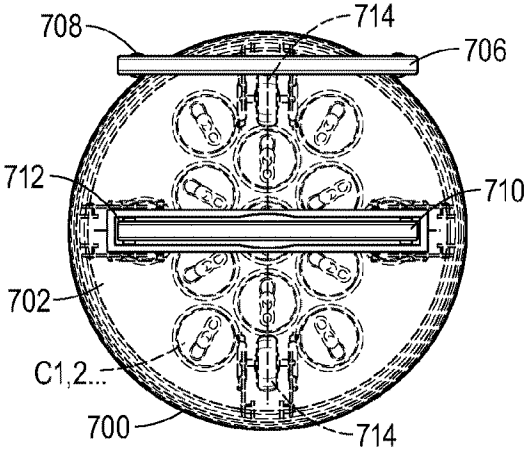
FIG. 7F depicts a top plan view of the embodiment depicted in FIGS. 7A-C.
Figure 7E:
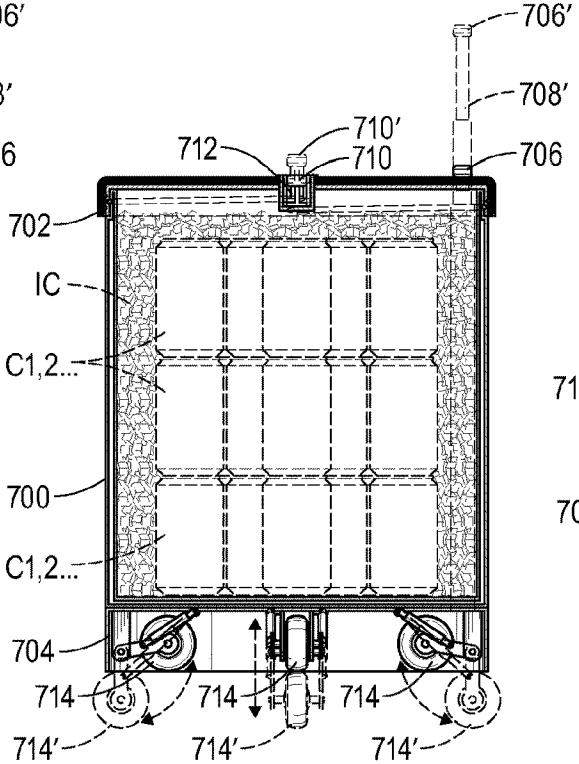
FIG. 7E depicts a side cross-sectional view of the embodiment depicted in FIGS. 7A-C.
Figure 7D:
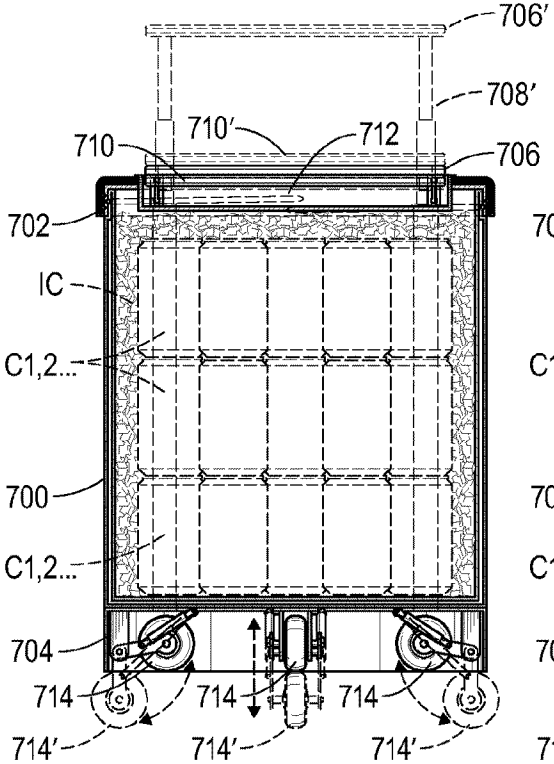
FIG. 7D depicts a frontal cross-sectional view of the embodiment depicted in FIGS. 7A-C.

Referring now to FIGS. 7D-7F, there is shown the instant rolling cylindrical container 700 having plethora of ice cubes IC surrounding plurality of beverage cans C1, C2, etc. FIG. 7F depicts a top view of this plurality of beverage cans C1, C2, etc., surrounded by plethora of ice cubes IC. Also shown is lid handle 710 retained within corresponding lid trough 712; telescoping movement handle 708 and hand-grip 706 for convenient and easy movement of rolling container 700. It will be seen that handle 710 is identified as 710' when disposed in its recess or trough 712. The pivotal relationship between plurality of receded wheels 714' and extended wheels 714 is clearly shown in FIGS. 7D and 7E.

Figures 7G, 7H, 7I:
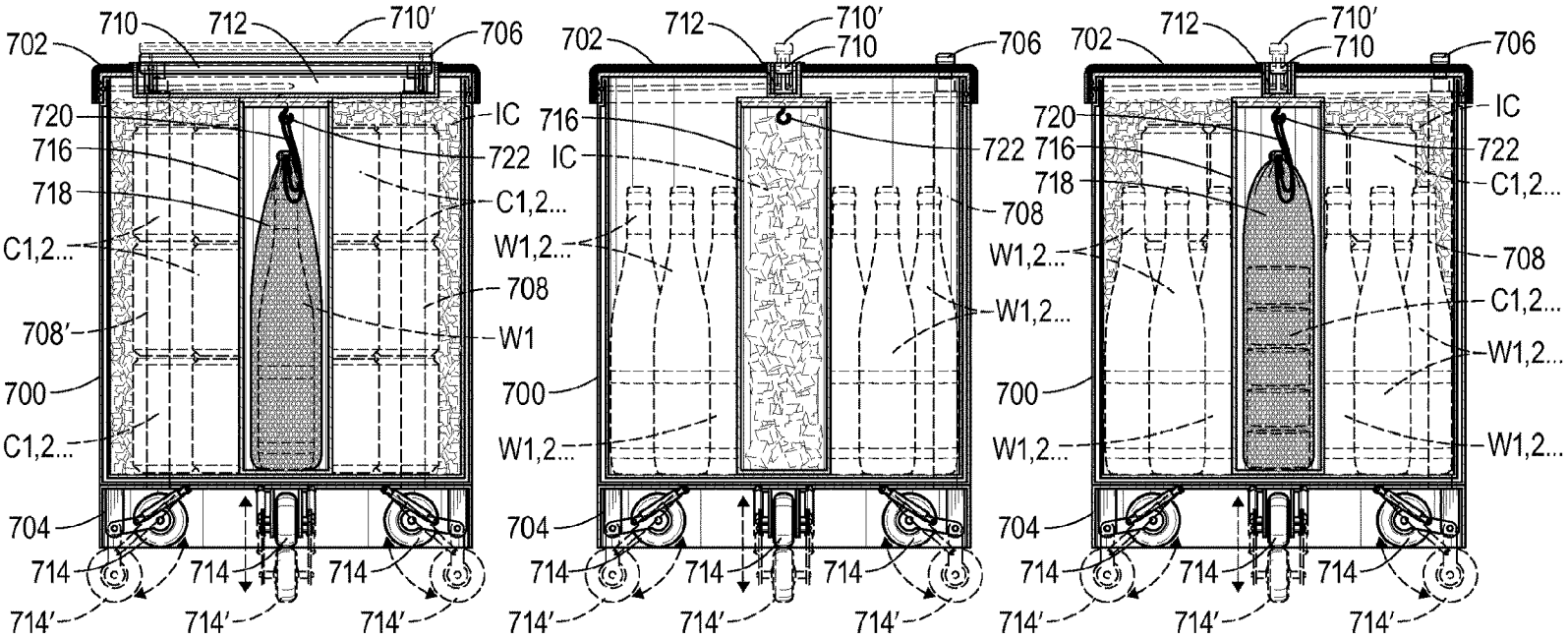
FIG. 7G depicts a frontal cross-sectional view of the embodiment depicted in FIGS. 7A-C, with a wine tube, net bag and single wine bottle.
FIG. 7H depicts a frontal cross-sectional view of the embodiment depicted in FIGS. 7A-C, with a wine tube filled with ice cubes and surrounded by plurality of wine bottles.
FIG. 7I depicts a frontal cross-sectional view of the embodiment depicted in FIGS. 7A-C, with a wine tube filled with a plurality of beverage cans within a net bag.

Now referring to FIGS. 7G-7I, there is depicted an embodiment of instant rolling cylindrical container 700 having plurality of beverage items including beverage cans C1, C2, . . . ; wine bottles W1, W2, . . . ; and plethora of ice cubes IC surrounding this plurality of beverage cans and wine bottles. It is an advantage and feature of this embodiment that there is included preferably in the central portion thereof a vertical central tube 716 configured to accommodate either a bottle of wine W1 as shown in FIG. 7G; a plethora of ice cubes IC as shown in FIG. 7H; or a plurality of beverage cans C1, C2, as shown in FIG. 7I. The embodiments depicted in FIGS. 7H and 7I also contain a plurality of wine bottles W1, W2, . . . around central tube 716. It will be observed that the beverage contents of central tube 716, corresponding to either a wine bottle W1 or plurality of beverage cans C1, C2, . . . should preferably be encased within a net bag 718 having draw string 722 which may be engaged with drawstring hook 722. It will be appreciated by those skilled in the art that this drawstring arrangement enables the drawstring to be readily removed from wheeled container 700 so that the enclosed wine bottle or other beverage may be expeditiously removed and placed into immediate service. Similarly, it should be understood that the central container, per se, may be readily removed from the implicated cylindrical container cavity or the like space if necessary. Those conversant in the art will readily appreciate that the materials of construction of the central tube 716 should preferably be akin to the hereinbefore elucidated Bodum and like material of construction to assure that the novel contemplated prescribed beverage temperature and beverage longevity may be sustained. That this centrally disposed vertical tube is enmeshed between preferably a chilled plurality of beverage cans, chilled plurality of wine bottles, possibly chilled plurality of long-neck beer bottles and the like, not to mention a plethora of ice cubes—all encased within the unique double-walled cylinder as herein described—affords optimal conditions for safely transporting thereof to offsite and even remote locations provided that circumstances are not inconsistent with handling such a mobile storage container encumbered with a formidable quantity of food and drink items, medical supplies, and like provisions, wherein temperature control is prerequisite to longevity thereof.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims.

What is claimed is:

1. A portable container for transporting and storing a plurality of perishable *pet food and drink* items at prescribed temperatures thereof and storing a [plethora] *plurality* of ice cubes, said portable container comprising:

a heat-resistant *and permanently sealed* rigid outer tubular member having [double-layered] *layered* insulation upon an adjacent inner tubular member for accommodating said plurality of perishable *pet food and drink* items therein *and also for accommodating said plurality of ice cubes therein*;

said heat-resistant and permanently sealed rigid outer tubular member comprising a first portion and a second portion conjoined magnetically at corresponding proximal longitudinal ends thereof, *each said first portion and said second portion readily being manually separated from the other portion*;

*said first portion having a first distal end opposite of said proximal end thereof;*

*said second portion having a second distal end opposite of said proximal end thereof;* a first endcap [enclosing one end of said outer tubular member and a second endcap enclosing the other opposite end of said outer tubular member] *including a first gasket, wherein said first gasket is screwably attached to the first endcap and said first gasket screwably attached to the first distal end*;

*said first gasket forming an air-tight and leak-proof connection with said first endcap and said first portion;*

*a second endcap including a second gasket, wherein said second gasket is screwably attached to the second endcap and said second gasket screwably attached to said second distal end;*

*said second gasket forming an air-tight and leak-proof connection with said second endcap and said second portion;*

*each of said first portion and said second portion configured as a pet dish or a pet bowl for storing in situ said plurality of perishable pet food and drink items, said plurality of perishable pet food and drink items being immediately available for consumption by a pet from said pet dish or said pet bowl when said first portion is manually separated from said second portion; and* a flexible handle disposed longitudinally of said outer tubular member attached at each said end thereof[;

a first and second longitudinal channel to accommodate a first and a second heavy-duty flexible straw and disposed adjacent the interior portion of said inner tubular member and extending at each end thereof into and through said first endcap and said second endcap at a first and second port, respectively, disposed upon said first and said second endcap; and a first and second removable plug sealably capping said first and said second port, respectively].

2. Said portable container recited in claim 1, wherein said rigid outer tubular member comprises stainless steel.

[3. Said portable container recited in claim 2, wherein said rigid outer tubular member is permanently sealed.]

[4. Said portable container recited in claim 3, wherein said rigid outer tubular member comprises a rubberized grip that circumscribes and is disposed midway between each of said opposite ends thereof.]

[5. Said portable container recited in claim 1, wherein said proximal ends of said first and said second portions may be invoked as pet dishes or pet cups when said first and said second portions are separated.]

6. Said portable container recited in claim [5] *1*, wherein bottoms of said proximal ends of said first and said second portions are rubberized to afford stability thereto.

7. Said portable container recited in claim 1, wherein said first portion and said second portion of said rigid outer tubular member are congruent.

[8. Said portable container recited in claim 1, wherein said first and said second longitudinal channel are congruent.]

[9. Said portable container recited in claim 1, wherein said first and said second heavy-duty flexible straws are congruent.]

* * * * *